(12) United States Patent
Shibasaki

(10) Patent No.: US 6,178,084 B1
(45) Date of Patent: Jan. 23, 2001

(54) ELECTRONIC APPARATUS

(75) Inventor: Kazuya Shibasaki, Tokyo (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/049,202

(22) Filed: Mar. 27, 1998

(30) Foreign Application Priority Data

May 7, 1997 (JP) .................................................. 9-117033

(51) Int. Cl.[7] ...................................................... G06F 1/16
(52) U.S. Cl. ........................... 361/683; 361/685; 361/684
(58) Field of Search .................................... 361/685, 683, 361/684; 364/708.1; 369/75.1, 77.1

(56) References Cited

U.S. PATENT DOCUMENTS

| 5,210,681 | * | 5/1993 | Hosoi et al. ........................ 361/685 |
| 5,311,455 | | 5/1994 | Ho . |
| 5,363,273 | | 11/1994 | Ma . |
| 5,506,749 | | 4/1996 | Matsuda . |
| 5,594,617 | * | 1/1997 | Foster et al. ........................ 361/683 |
| 5,828,547 | * | 10/1998 | Francovich et al. ................. 361/685 |
| 5,905,632 | * | 5/1999 | Seto et al. ........................... 361/683 |

FOREIGN PATENT DOCUMENTS 5-20120   3/1993 (JP) .

* cited by examiner

*Primary Examiner*—Leo P. Picard
*Assistant Examiner*—John D. Reed
(74) *Attorney, Agent, or Firm*—Finnegan, Henderson, Farabow, Garrett & Dunner, L.L.P.

(57) ABSTRACT

A housing of a computer is provided with a mounting section in which first and second pack-type devices can be set alternatively. The mounting section is defined by a recess that opens continuously in a bottom wall and a side wall of the housing. The first pack-type device includes a first device body and a first cover removably attached to the first device body, and has a thickness substantially equal to the depth of the recess. The first pack-type device is set in the recess in a manner such that the first cover closes an the of the recess and is flush with the bottom wall. The second pack-type device includes a second device body and a second cover removably attached to the second device body, and has a thickness greater than the depth of the recess. The second pack-type device is set in the recess in a manner such that the second cover closes the opening of the recess and project from the bottom.

14 Claims, 9 Drawing Sheets

ELECTRONIC APPARATUS

BACKGROUND OF THE INVENTION

The present invention relates to an electronic apparatus, such as a portable computer, having a pack-type device removably attached to its housing.

In a portable computer, for example, its housing is provided with a mounting section, in which pack-type devices for expanded functions can be set alternatively as required. These devices include an FDD (floppy disk drive), CD-ROM drive, DVD (digital versatile disk) drive, etc.

In general, each pack-type device is in the form of a flat metallic casing that has a system unit therein. Conventionally, therefor, a flat mounting section for a pack-type device is provided in the housing of the portable computer so that one end portion thereof opens in the outer surface of the housing and serves as a device loading slot. The pack-type device is fitted into or removed from the mounting section through the loading slot.

However, the conventional arrangement in which the pack-type device is set in the housing of the computer has the following problems.

The mounting section in the housing is formed having specific dimensions (length, width, and depth). Although the mounting section can be loaded with a pack-type device of a size equal to or smaller than its size, therefore, it cannot receive a larger device. In other words, the sizes of available pack-type devices depend on that of the mounting section.

In developing a portable computer, the mounting section of the housing is designed to be adjusted to the maximum size of pack-type devices that are initially expected to be used therewith. After the computer is completed as a final product, however, it may be necessary to use a pack-type device that is larger than the mounting section. In this case, the device cannot be set in the mounting section to expand the faculty of the computer unless it can be made smaller than the mounting section.

Moreover, the size of the mounting section is influenced by the size of the largest of the available pack-type devices, and the housing size by the size of the mounting section. Accordingly, the size of the entire housing should be subject to the influence of that of the largest devices to be set in the mounting section.

Thus, even in case the largest pack-type devices are poorly demanded ones that are used only rarely, the overall size of the housing must inevitably be settled depending on the dimensions of these devices.

BRIEF SUMMARY OF THE INVENTION

The present invention has been contrived in consideration of these circumstances, and its object is to provide an electronic apparatus capable of being loaded alternatively with a plurality of pack-type devices of different sizes despite the size differences, and having a mounting section that can be sized without being influenced by the maximum size of the pack-type devices to be set therein.

In order to achieve the above object, an electronic apparatus according to the present invention comprises: a housing including a bottom wall, a plurality of side walls set up individually on the peripheral edges of the bottom wall, and a mounting section formed of a recess opening to the bottom wall; a first pack-type device including a first device body having a first thickness and a first cover removably attached to the first device body, the first device being adapted to be removably fitted to the mounting section in a manner such that the first cover closes the opening of the mounting section and is flush with the bottom wall; and a second pack-type device including a second device body having a second thickness greater than the first thickness and a second cover removably attached to the second device body, the second device being adapted to be removably fitted to the mounting section in a manner such that the second cover closes the opening of the mounting section and projects from the bottom wall.

According to the present invention, the mounting section has a depth substantially equal to the sum of the respective thickness of the first device body and the first cover.

Further, the mounting section has a depth smaller than the sum of the respective thickness of the second device body and the second cover. The second device body has a thickness greater than the depth of the mounting section.

According to the invention, moreover, the housing includes a plurality of first leg portions on the bottom wall, having a given height, and the first pack-type device includes a second leg portion on the first cover, having the same height as the first leg portions.

In this case, the second pack-type device is formed so that the height of the projection thereof from the bottom wall is equal to the height of the first leg portions. Alternatively, the second pack-type device includes a third leg portion on the second cover such that the sum of the height of the projection of the second cover from the bottom wall and the height of the third leg portion is equal to the height of the first leg portions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 14 show a portable computer according to an embodiment of the present invention, in which FIG. 1 is a perspective view showing an outline of the computer, FIG. 2 is a perspective view showing a base portion of a housing of the computer, FIG. 3 is a perspective view showing the housing base portion of the computer with no pack-type device thereon, FIG. 4 is an enlarged plan view, partially in section, showing a mounting section defined in the housing of the computer, FIG. 5 is a sectional view taken along line V—V of FIG. 4, FIG. 6 is a sectional view taken along line VI-VI of FIG. 4, FIG. 7 is an exploded perspective view showing. an FDD body and a first cover which are to be fitted to the mounting section of the housing, FIG. 8 is an exploded perspective view showing the FDD body and a shield casing which are to be fitted to the mounting section of the housing, FIG. 9 is an exploded perspective view showing a CD-ROM drive and the first cover, FIG. 10, is an exploded perspective view of the CD-ROM drive, FIG. 11 is an exploded perspective view showing a DVD drive and a second cover which are to be fitted to the mounting section, FIG. 12 is a perspective view showing the housing loaded with the DVD drive, FIG. 13 is a sectional view taken along line XIII—XIII of FIG. 12, and FIG. 14 is a front view schematically showing the computer.

DETAILED DESCRIPTION OF THE INVENTION

Figure 1:
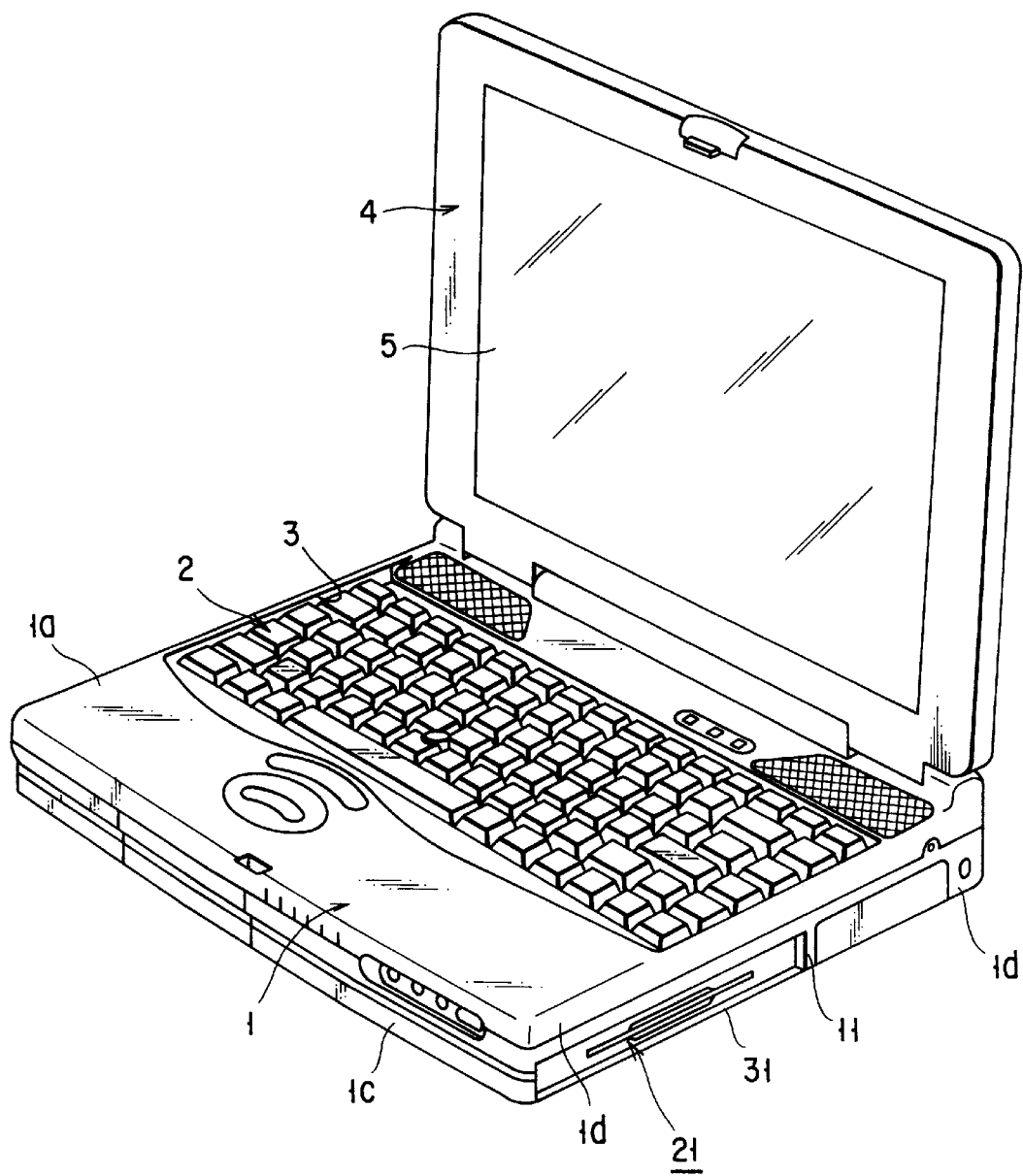

A portable computer as a portable electronic apparatus according to an embodiment of the present invention will now be described in detail with reference to the accompanying drawings.

The portable computer comprises a computer body and a plurality of pack-type devices that can be removably set in the computer body in an alternative manner. Available pack-type devices include, for example, an FDD 21, CD-ROM drive 22, and DVD drive 23, which will be mentioned later.

The following is a brief description of these elements. The FDD 21 is composed of an FDD body contained in a shield casing. The respective casings of the CD-ROM drive 22 and the DVD drive 23 themselves constitute a shell of the apparatus. The FDD 21 and the CD-ROM drive 22 have the same external dimensions. The DVD drive 23 shares the width and depth with the FDD 21 and the CD-ROM drive 22 and has a greater thickness. Two covers 31 and 32 of different types are provided as cover means to be combined with these drives. The first cover 31 can be combined with the FDD 21 or CD-ROM drive 22, and the second cover 32 with the thicker DVD drive 23.

The following is a detailed description of various parts of the apparatus.

Figure 2:
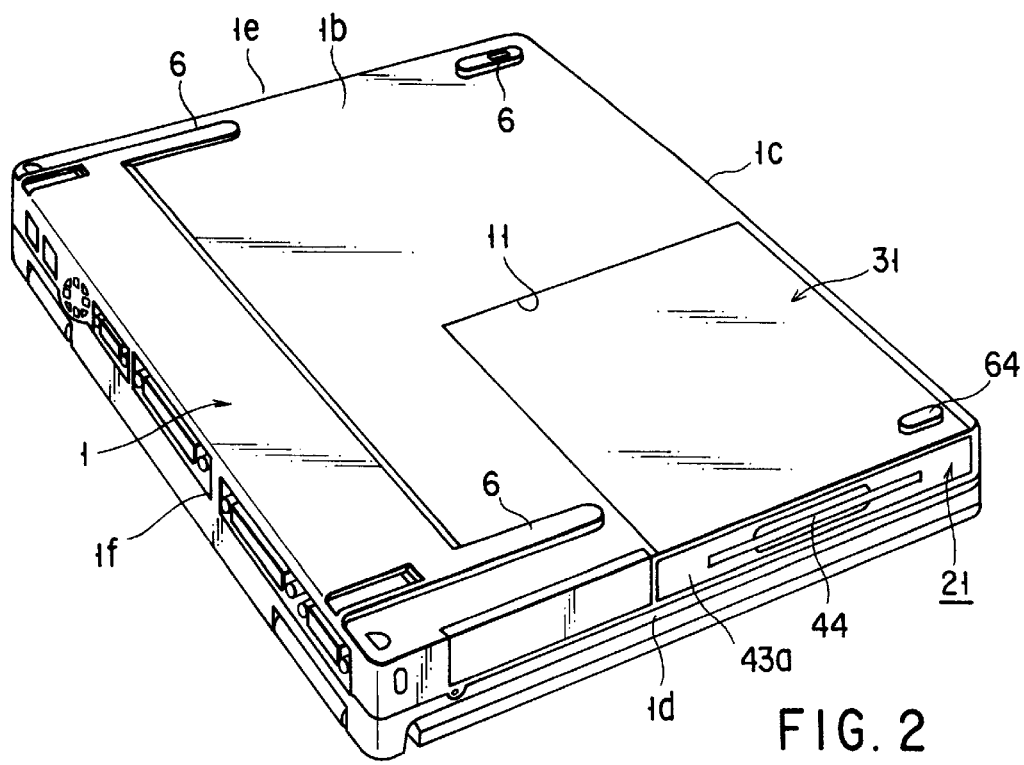
Figure 3:
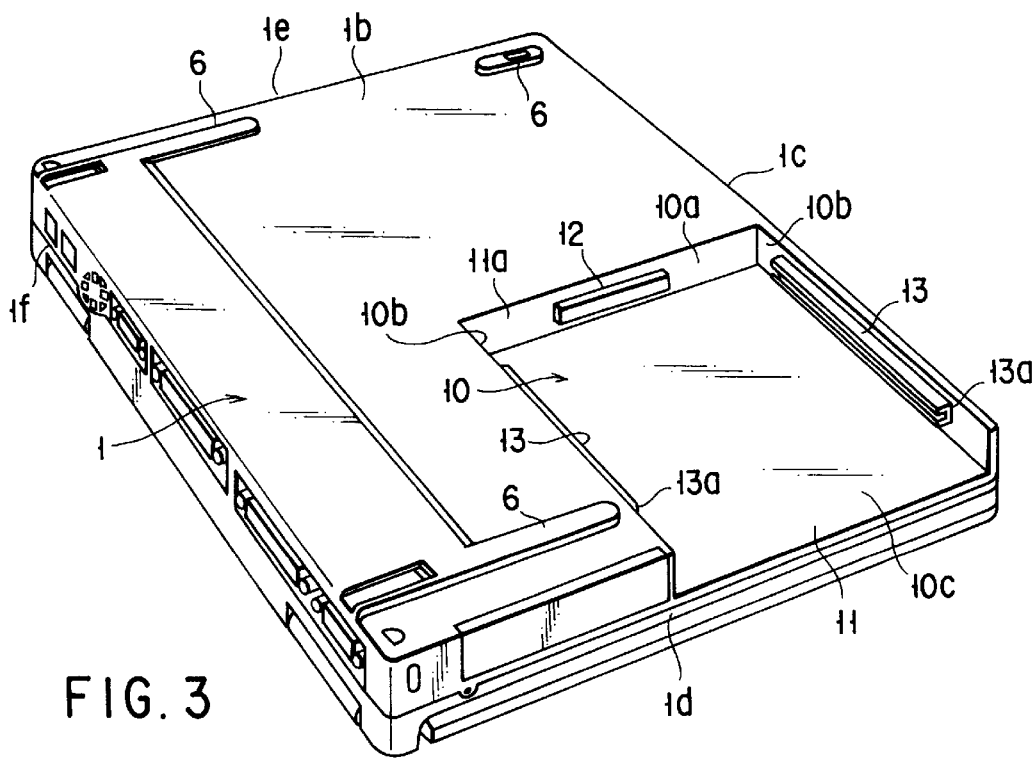
Figure 4:
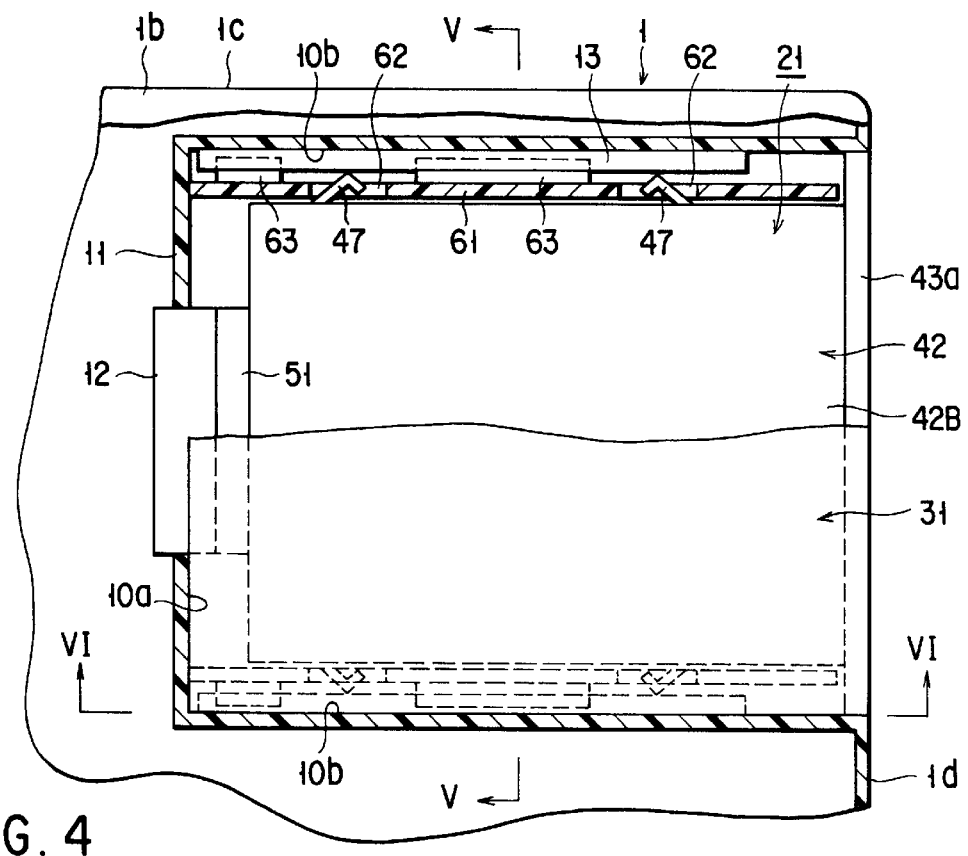
Figure 5:
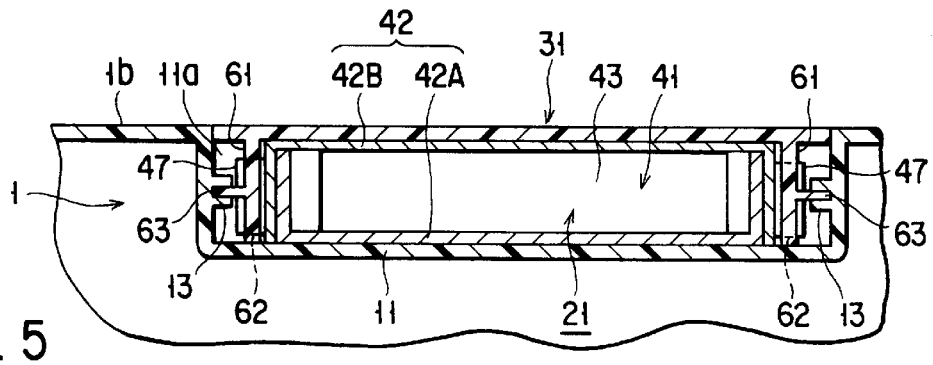
Figure 6:
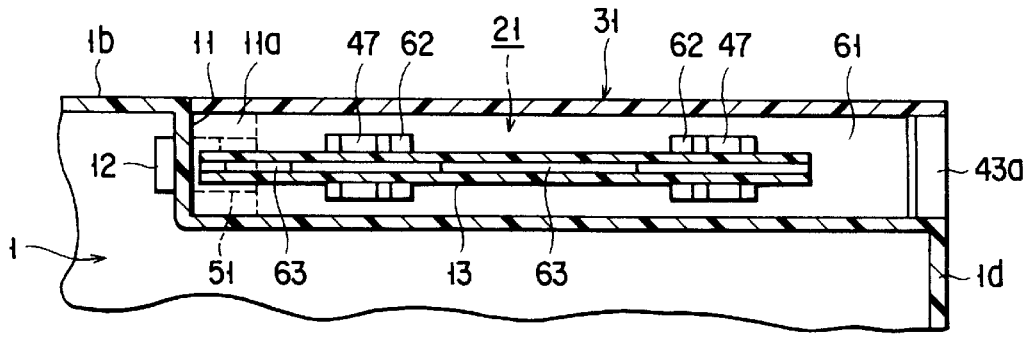

As shown in FIGS. 1 to 3, the computer body includes a plastic housing 1, which is in the form of a flat rectangular box having a greater dimension (length) from side to side and a smaller dimension in the width direction. The housing 1 includes a rectangular bottom wall 1b and a front wall 1c, left- and right-hand side walls 1d and 1e, and a rear wall 1f that are set up individually on the peripheral edges of the bottom wall.

Provided on an upper surface 1a of the housing 1 is a keyboard 2 that has a large number of keys 3 for use as input means. Mounted in the housing 1 are a circuit board, electronic parts, etc. (not shown) that constitute a necessary circuit for the portable computer. Further, a flat rectangular display unit 4 is provided on the upper surface of the housing so as to be rockable between a closed position, in which it covers the keyboard, and an open position in which the keyboard is exposed.

As shown in FIGS. 2 to 6, the housing 1 is provided with a mounting section 10 at the bottom, in which the FDD 21, CD-ROM drive 22, or DVD drive 23 can be mounted alternatively. The mounting section 10 is formed of a flat rectangular recess 11 in the housing 1 that is located near a corner portion in which the front wall 1c and the right-hand side wall 1d of the housing 1 meet, and has a depth greater than its width. The recess 11 has a continuous opening 11a that opens two-dimensionally in the bottom wall 1b and the side wall 1d.

The depth and width of the recess 11, which correspond to the length and width (depth) of the housing 1, respectively, are set so that the recess 11 can suitably hold a first assembly that combines the first cover 31 and the FDD 21 or CD-ROM drive 22 and a second assembly that combines the second cover 32 and the DVD drive 23. The depth of the recess 11 is substantially equal to the thickness of the first assembly and smaller than the thickness of the second assembly.

The recess 11 is defined by an end wall 10a extending parallel to the side wall 1d of the housing 1, a pair of side walls 10b parallel to the front wall 1c of the housing, and a bottom wall 10c parallel to the bottom wall 1b of the housing. Located in the center of the end wall 10a is a connector 12 that extends in the transverse direction. The connector 12 is connected electrically to the circuit board (not shown) in the housing 1.

Figure 7:
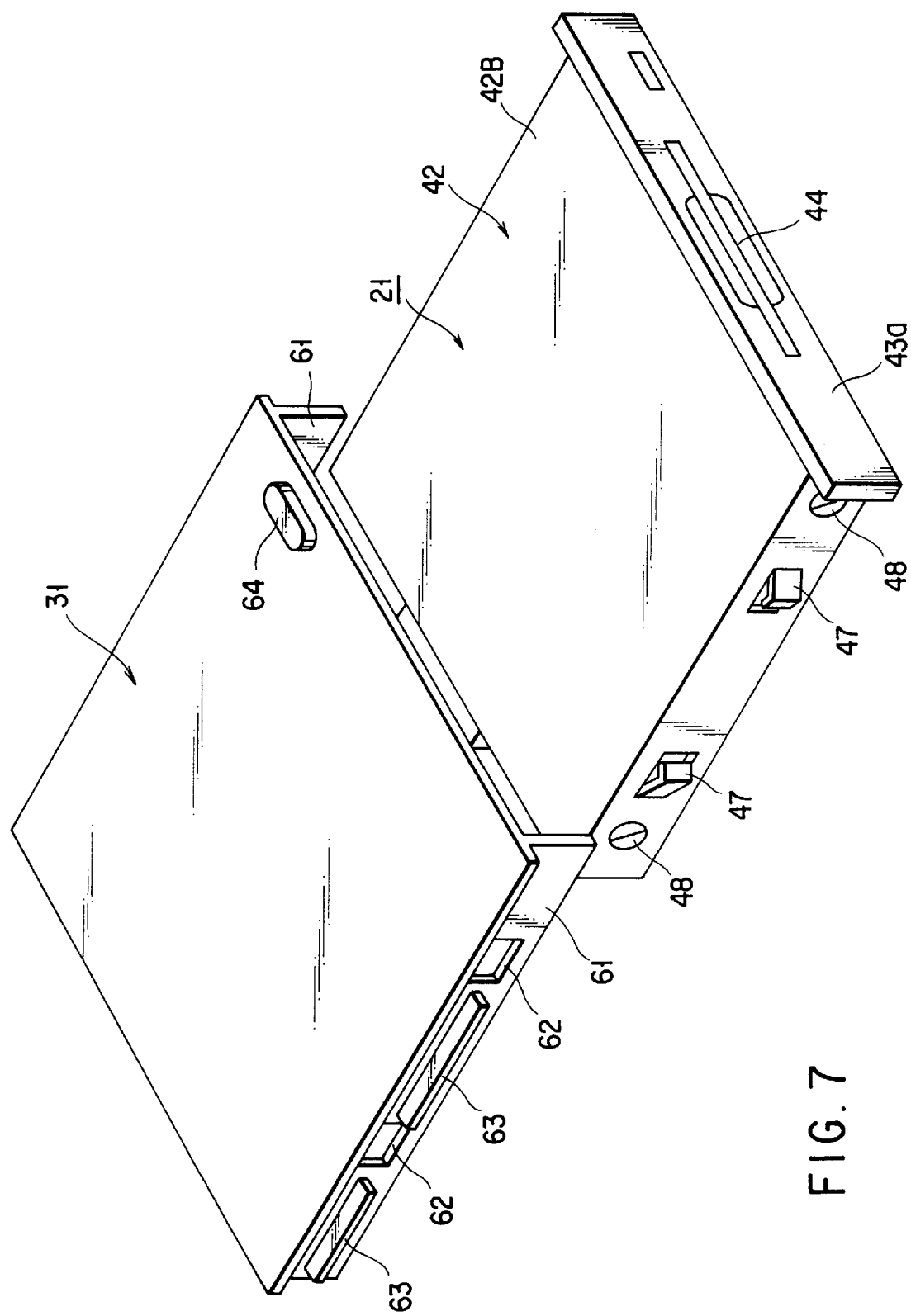

The left- and right-hand side walls 10b are provided individually with guide rails 13 (only one guide rail 13 is shown in FIGS. 3 and 7) that extend in the longitudinal direction of the recess 11. These guide rails 13, which have a U-shaped cross section each, for example, serve to guide the FDD 21, CD-ROM drive 22, or DVD drive 23 in sliding motion when the drive is set in the mounting section 10. Further, the rails 13 fixedly support the set drive lest it slip out of the recess 11. The rails 13 are arranged so that their respective front ends 13a are situated off and behind the side wall 1d of the housing 1 so that each drive can be easily set in the recess 11.

As shown in FIGS. 2 and 3, moreover, leg portions 6 with a given height protrude individually from the left- and right-hand rear portions and the left-hand front portion of the bottom wall 1b of the housing 1. The housing 1 is placed on a desk or the like in a manner such that the leg portions 6 are in contact with the top of the desk.

As shown in FIGS. 4 to 8, the FDD 21 is provided with an FDD body 41 and a shield casing 42, which includes a lower casing 42A and an upper casing 42B and contains the FDD body therein. The FDD body 41 includes a flat rectangular body casing 43, which is formed of a metal plate having a depth greater than its width. Arranged in the body casing are a drive mechanism for driving a floppy disk, a head mechanism for recording in and retrieving information from the floppy disk, etc. A front panel portion 43a of the body casing 43 is formed having a disk loading slot 44 through which the floppy disk is loaded and unloaded.

The lower casing 42A, which is formed of a metal plate, includes a flat rectangular bottom wall, which is a size larger than the body casing 43, and side walls set up individually on the left- and right-hand edges and the rear edge of the bottom wall. The FDD body 41 is located on the bottom wall of the lower casing 42A so that it is oriented in the longitudinal direction. The front panel portion 43a of the body casing 43 is situated outside a front aperture of the lower casing 42A.

Mounting brackets 45 are fixed to the left- and right-hand side faces of the body casing 43. Each bracket 45 is attached to the bottom wall of the lower casing 42A by means of a screw 46. The upper casing 42B, which is formed of a metal plate, includes a flat rectangular top wall, which is a size larger than the body casing 43, and a pair of side walls that are set up downward from the left- and right-hand side edges of the top wall, individually. The upper casing 42B is a little wider than the lower casing 42A, and its left- and right-hand side walls are in contact with the respective outer surfaces of their corresponding side walls of the lower casing 42A. As means for mounting a first cover 31 (mentioned later), for example, two engaging clicks 47, elastically deformable, protrude outward from each side wall of the upper casing 42B. The clicks 47 are spaced in the assembly of the casing 42B.

The upper casing 42B is placed astride the upper side of the lower casing 42A, and the opposite side walls of the lower casing 42A and their corresponding side walls of the upper casing 42B are clamped and fixed together by means of screws 48. Thus, the upper and lower casings 42B and 42A are combined to form the box-shaped shield casing 42 that contains the FDD body 41 therein. The shield casing 42 has necessary external dimensions for the construction of the FDD 21.

Figure 8:
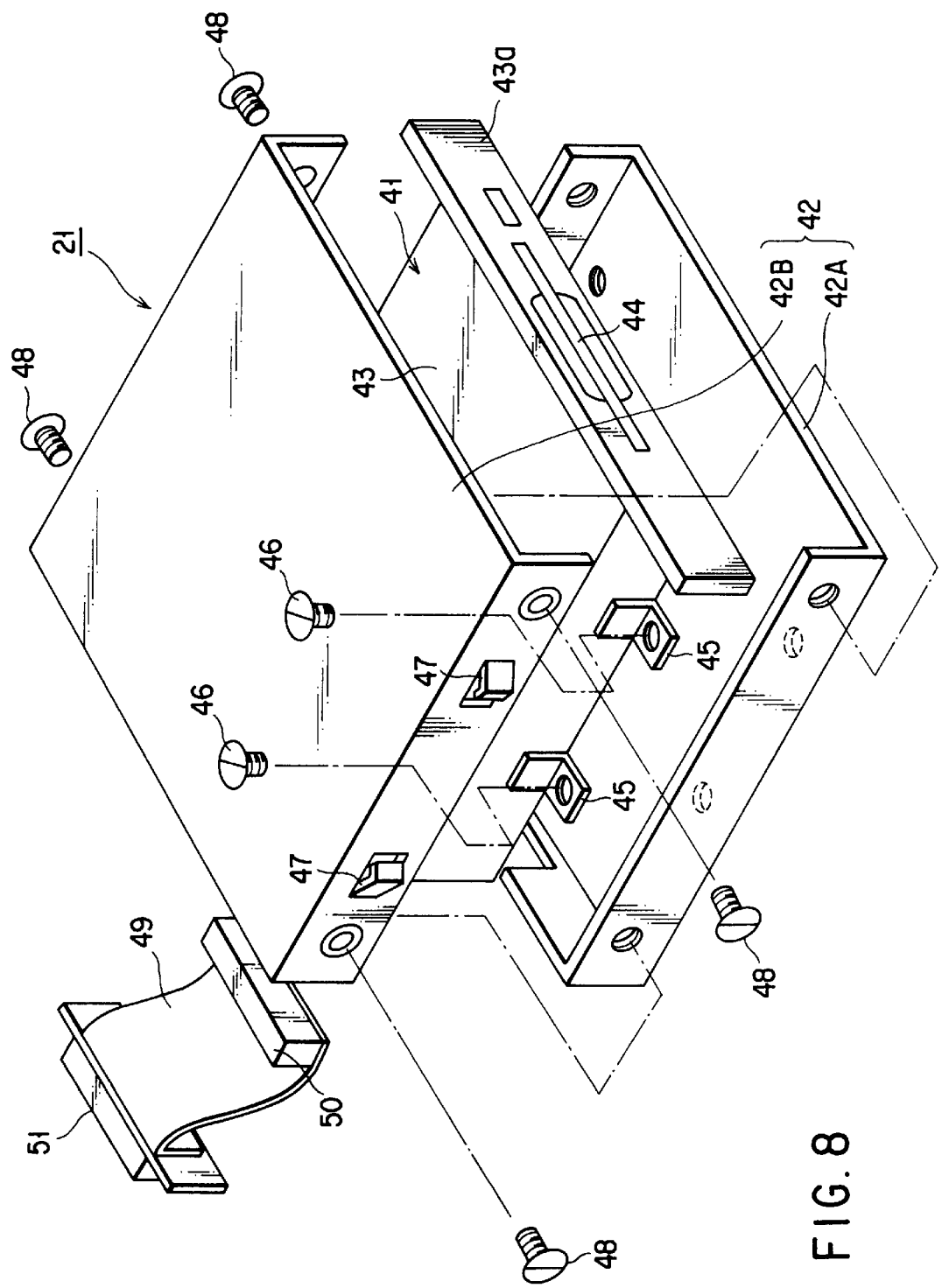

At the back of the FDD body 41, as shown in FIG. 8, connectors 50 and 51, which are connected by means of a flexible printed circuit board 49, are housed in the shield casing 42. The one connector 50 is connected to a connector (not shown) on the rear end face of the FDD body 41, while the other connector 51 is fitted in an end face of the lower casing 42A and projects outward.

As shown in FIGS. 2 and 4 to 7, the first cover 31 to be combined with the FDD 21 constructed in this manner is a flat plate that is formed of the same synthetic resin as the housing 1. The first cover 31 is a rectangular structure having a size corresponding to that portion of the opening of the recess, which opens to the bottom wall 1b. A leg portion 64 having the same height as the leg portions 6 of the housing 1 is formed integrally on a corner portion of the outer surface of the first cover 31.

A pair of support walls 61, which extend in the longitudinal direction of the first cover 31, protrude integrally from those portions of one surface (inner surface) of the cover 31 which are situated a little nearer to the center than the opposite side edges of the cover 31. These support walls 61 are arranged at a space equivalent to the width of the shield casing 42 of the FDD 21 and the width of a body casing 71 (mentioned later) of the CD-ROM drive 22. Further, each support wall 61 has a height equal to or a little smaller than the thickness of the casings 42 and 71.

Each support wall 61 is formed having a pair of engagement holes 62 that are spaced in the longitudinal direction of the wall 61. The holes 62 can be opposed individually to the clicks 47 on the upper casing 42B of the FDD 21. A pair of guide projections 63 are formed on the outer surface of each support wall 61 and extends in the longitudinal direction of the cover 31. The projections 63 can engage their corresponding guide rails 13 on the side walls of the recess 11 of the housing 1.

The FDD 21 and the first cover 31 thus constructed are combined and coupled in the following manner. The first cover 31 is fitted on the shield casing 42 of the FDD 21 from above so that the casing 42 is situated between the support walls 61, and the walls 61 are caused to engage their corresponding side faces of the casing 42. In this case, the support walls 61, formed of an elastic synthetic resin, are spread outward as the first cover 31 is fitted on the shield casing 42. If the support walls 61 are returned to their original position when the cover 31 lies on the upper surface of the casing 42, the clicks 47 on the casing 42 engage their corresponding engagement holes 62 in the walls 61. By combining the clicks and the engagement holes in this manner, the first cover 31 and the shield casing 42 can be securely coupled with ease.

In setting the assembly thus combining the FDD 21 and the first cover 31 in the mounting recess 11 of the housing 1, as shown in FIG. 2, the housing 1 is reversed so that the bottom wall 1b faces upward. Subsequently, the assembly is located in front of the aperture of the recess 11 on the side of the side wall 1d. In this case, the assembly is oriented so that the connector 51 of the FDD 21 is situated on the recess 11 side.

Then the assembly is inserted into the recess 11 with its side face on the side of the side wall 1d forward, and the projections 63 on the support walls 61 of the first cover 31 are inserted into their corresponding guide rails 13 of the recess 11. Thereafter, the assembly is slid along the rails 13 to the inner part of the recess 11 so that the connector 51 of the FDD 21 is connected to the connector 12 in the recess 11.

Thus, the FDD 21 is fitted in place in the recess 11 and is connected electrically to the computer body by means of the connectors 51 and 12. The front panel portion 43a of the FDD 21 is fitted in that portion (second opening portion) of the opening of the recess 11 which is open to the side wall 1d, thereby closing the second opening portion. On the other hand, the first cover 31 is fitted in that portion (first opening portion) of the opening of the recess 11 which is open to the bottom wall 1b, thereby closing the first opening portion entire. Since the thickness (first thickness) of the assembly that combines the FDD 21 and the first cover 31 is substantially equal to the depth of the recess 11, the cover 31 is situated flush with the bottom wall 1b of the housing 1, and constitutes part of the wall 1b.

In this manner, the FDD 21 is concealed under the first cover 31 and held in the housing 1. Since the cover 31 is flush with the bottom wall 1b of the housing 1, moreover, that portion which houses the FDD 21 can be finished enjoying a good appearance and is handy.

Since the mounting recess 11 of the housing 1 is open in two planes covering the bottom portion 1b and the side wall 1c of the housing, the assembly that is composed of the FDD 21 and the first cover 31 can be conveniently loaded into the recess 11 through a wide area.

By combining the guide rails 13 of the mounting recess 11 and the projections 63 of the first cover 31, the assembly composed of the FDD 21 and the first cover 31 can be smoothly loaded into the recess 11, and the loaded assembly can be prevented from being disengaged from the recess 11.

Further, a locking mechanism (not shown) is provided between the rear end portion of the FDD 21 and the end wall 10a of the recess 11. This mechanism serves to prevent the loaded assembly in the recess 11 from slipping out of the recess through the opening of the recess on the side of the side wall 1d.

With the assembly is set in the recess 11, the first cover 31 is situated flush with the bottom wall 1b of the housing 1, and the leg portion 64 on the first cover 31 is formed having the same height with the leg portions 6 of the housing 1. Thus, the leg portions 6 and 64 are situated on the same height level with respect to the bottom wall 1b of the housing 1, so that the computer body 1 can be steadily supported by means of these leg portions.

Figure 9:
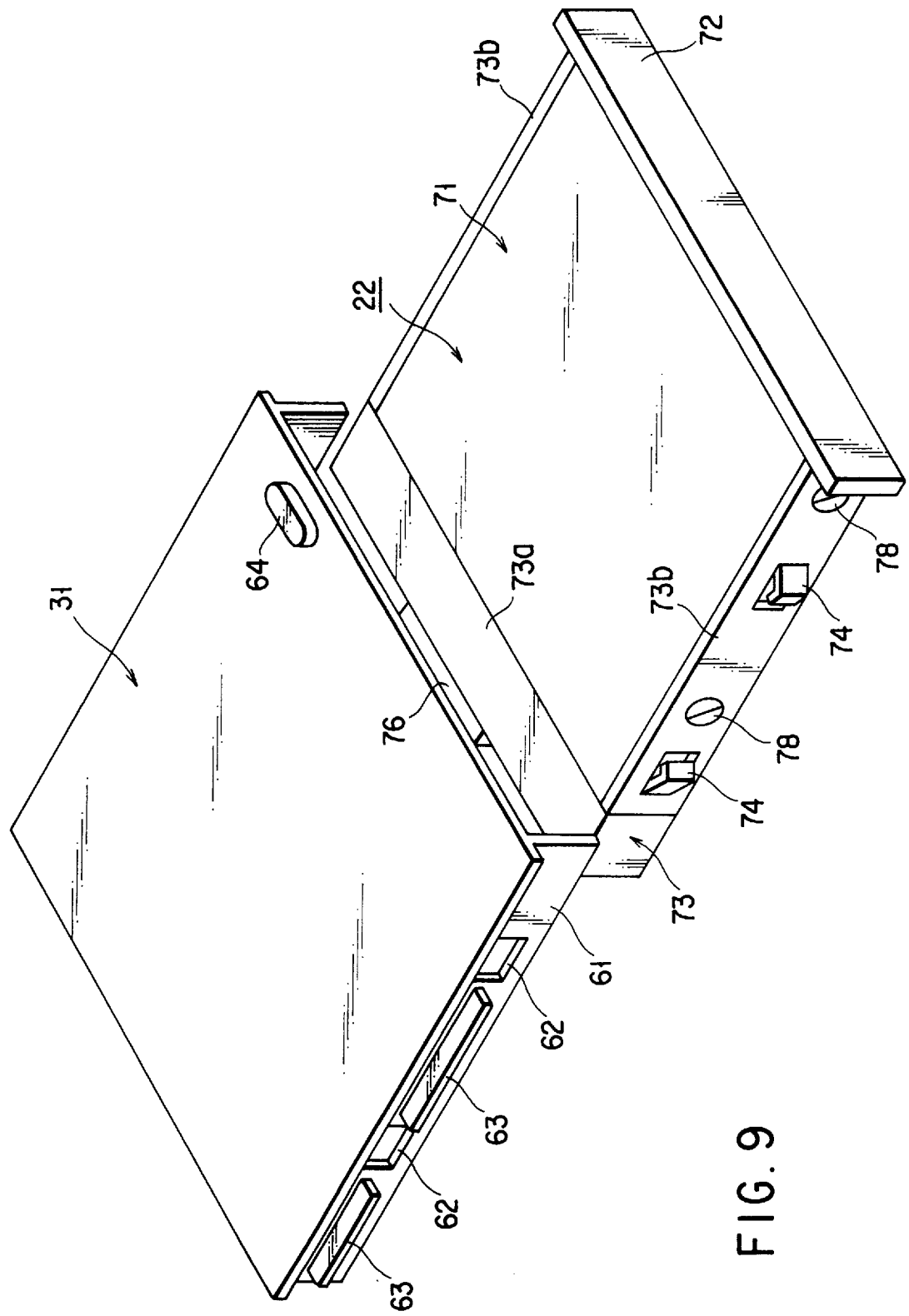
Figure 10:
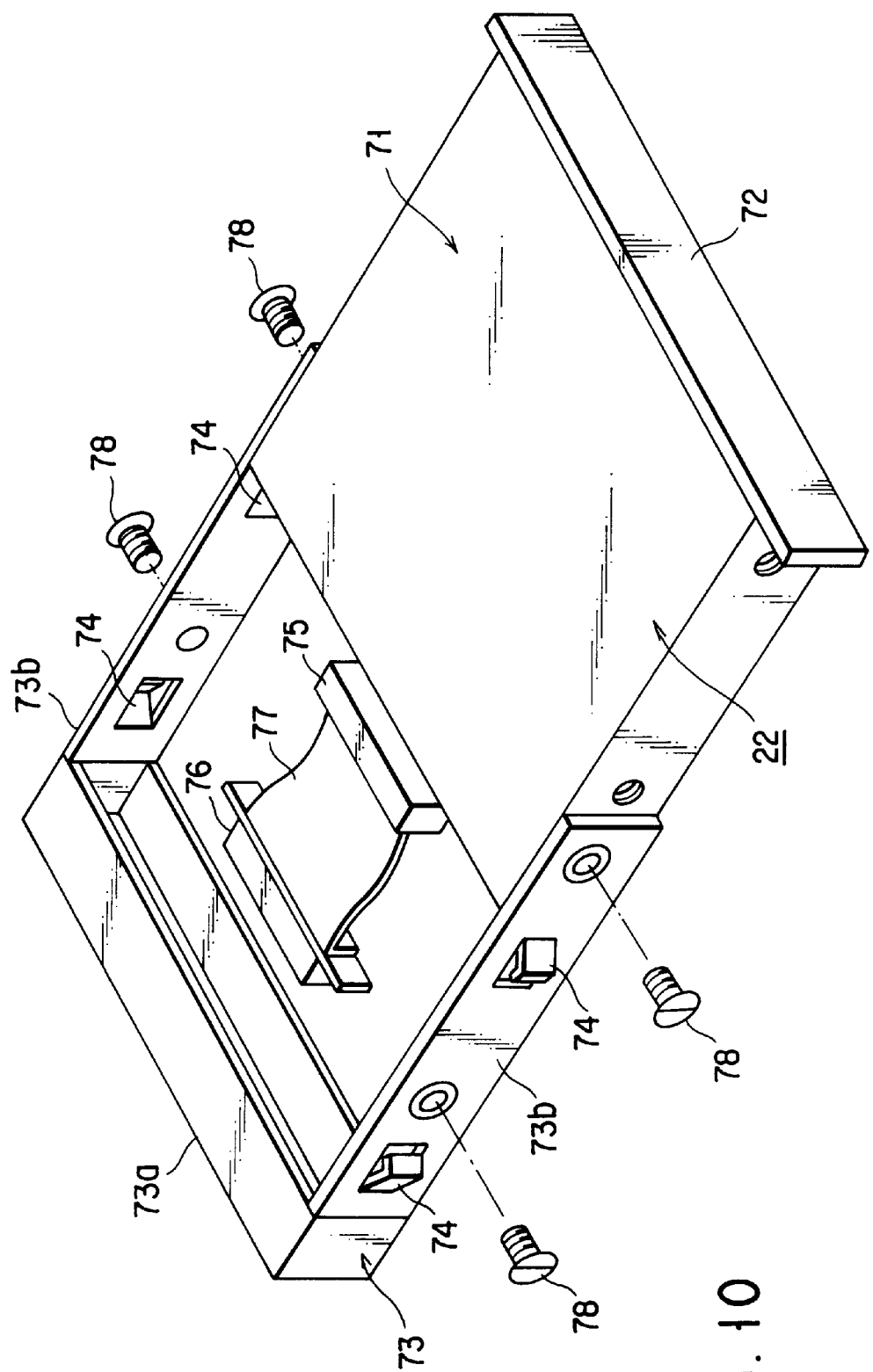

Since its body casing is solid, the CD-ROM drive 22 need not be encapsulated in any shield casing, and is used in the form of a simple structure, as shown in FIGS. 9 and 10. The drive 22 includes a flat rectangular body casing 71 that is formed of a solid metal plate, and a mechanism (not shown) for driving a CD-ROM is disposed in the casing 71. Further, a tray 72 for carrying the CD-ROM is located in the casing 71. A front end wall of the tray 72 projects outward from a front aperture portion of the body casing 71.

A retaining frame 73 of, e.g., a metal material for attaching the body casing 71 to the first cover 31 is fixed to the casing 71. The frame 73 includes a body 73a to be combined with the rear end portion of the body casing 71 and a pair of arm portions 73b. The arm portions 73b protrude individually from the opposite side portions of the body 73a, extend in the longitudinal direction of the casing 71, and engage the left- and right-hand side portions of the casing 71, respectively. Each arm portion 73b is provided with a pair of outwardly protruding clicks 74 that are spaced in the longitudinal direction of the casing 71. The clicks 74 can engage the engagement holes 62 in their corresponding support wall 61 of the first cover 31, individually.

Arranged between the rear end of the body casing 71 and the body 73a are connectors 75 and 76 and a flexible wiring board 77 that connects these connectors. The connector 75 is attached to the rear end face of the casing 71 and connected electrically to a circuit in the casing 71. The other connector 76 is attached to the body 73a of the retaining frame 73.

The retaining frame 73 is fixed to the body casing 71 by means of screws 78 in a manner such that the body 73a is in engagement with the rear end face of the casing 71 and that the arm portions 73b are individually in contact with the opposite side faces of the casing 71. The body casing 71 has the same thickness as the shield casing 42 of the FDD 21, and an assembly that is composed of the casing 71 and the retaining frame 73 has the same width as the casing 42. Thus, the assembly composed of the casing 71 and the frame 73 has a width equal to the space between the support walls 61 of the first cover 31 and a length equivalent to that of the cover 31 in the longitudinal direction.

The CD-ROM drive 22 constructed in this manner is combined with the first cover 31. The cover 31 is fitted on the body casing 71 from above so that the support walls 61 are individually in contact with the opposite side faces of the casing 71. As this is done, the clicks 74 on the body casing 71 engage the engagement holes 62 in each support wall 61, individually. In consequence, the CD-ROM drive 22 and the first cover 31 are coupled to each other.

The assembly composed of the CD-ROM drive 22 and the surface cover 31 has the same size as the assembly composed of the FDD 21 and the cover 31, and is loaded into the recess 11 of the housing 1 in the same manner as aforethe. Thus, the assembly of this composition can produce the same effect as the assembly that is composed of the FDD 21 and the cover 31.

Figure 11:
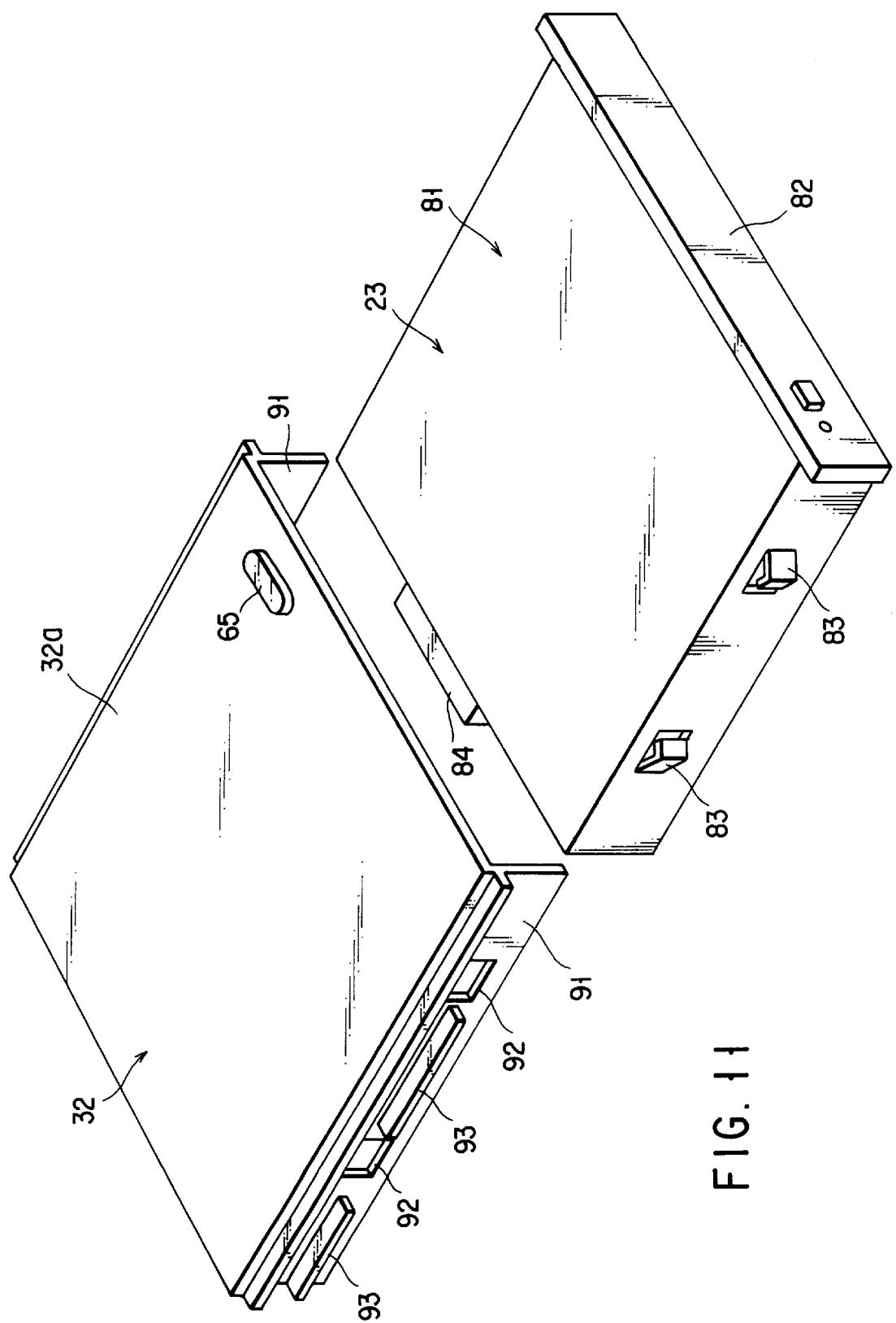
Figure 12:
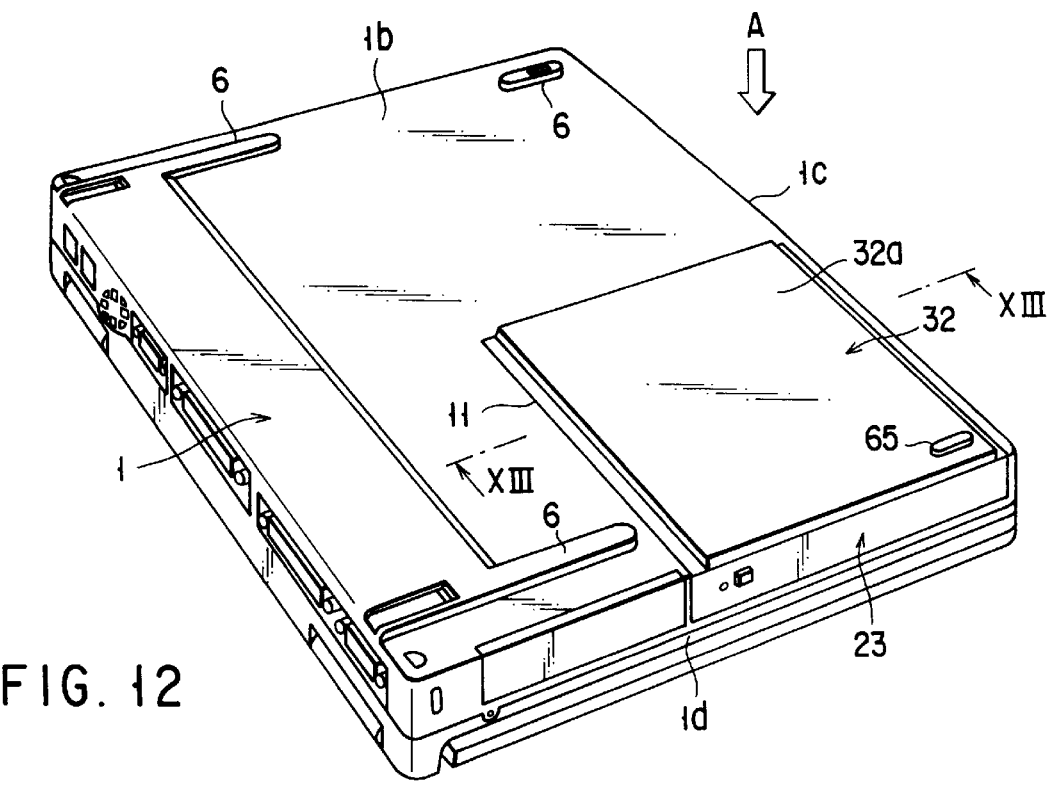
Figure 13:
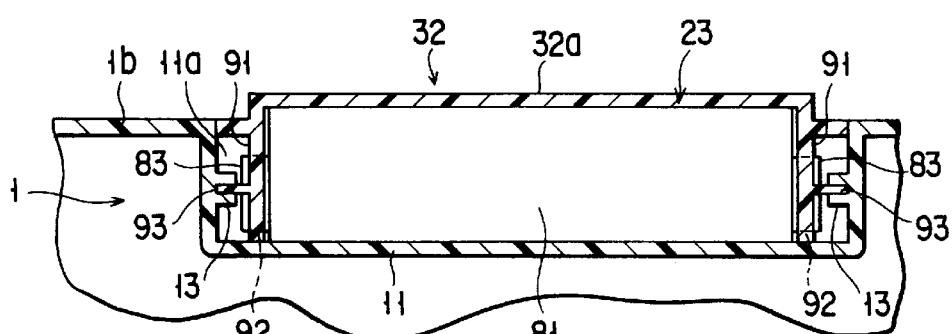

Referring now to FIGS. 11 to 13, the DVD drive 23 and the second cover 32 to be combined therewith will be described.

Since its body casing is solid, the DVD drive 23 is used in the form of a simple structure without being encapsulated in any shield casing. More specifically, the drive 23 includes a flat rectangular body casing 81 that is formed of a solid metal plate. The casing 81 has the same width and length as the shield casing 42 of the FDD 21 and a thickness (second thickness) greater than that of the casing 42. Thus, the body casing 81 has a thickness greater than the depth of the recess 11 of the housing 1.

The body casing 81 contains a disk drive mechanism (not shown) and a tray 82 that is used to carry a disk thereon. The front end face of the tray 82 projects outward from the front aperture portion of the casing 81. Each side face of the casing 81 is formed having a pair of outwardly protruding clicks 83 that are spaced in the longitudinal direction of the casing 81. A connector 84 is attached to the rear end face of the casing 81 and connected electrically to a circuit in the casing 81.

The second cover 32 to be combined with the DVD drive 23 is formed of the same synthetic resin as the housing 1, and is constructed basically in the same manner as the first cover 31. The cover 32 differs from the cover 31 only in that it includes a raised portion 32a.

More specifically, the second cover 32 is a rectangular structure that has a size corresponding to the first opening portion of the recess 11 of the housing 1 on the side of the bottom wall 1b, that is, a size large enough to cover the whole first opening portion. The whole outer surface of the second cover 32 except its opposite side edge portions is raised a degree, thus forming the raised portion 32a. The width of the portion 32a is substantially equal to that of the body casing 81 of the DVD drive 23.

A pair of support walls 91, which extend in the longitudinal direction of the second cover 32, are formed integrally on those portions of the inner surface of the cover 32 which are situated a little nearer to the center than the opposite side edges of the cover 32. The support walls 91 are arranged at a space substantially equal to the width of the body casing 81, and have a height equal to or a little smaller than the thickness of the casing 81. Further, each support wall 91 is formed having a pair of engagement holes 92 that are spaced in the assembly of the wall 91. The holes 92 can engage the clicks 83 on the body casing 81, individually. Each support wall 91 has a pair of projections 93 that are arrange in the longitudinal direction of the cover 32. The projections 93 can engage their corresponding guide rails 13 on the side walls of the recess 11 of the housing 1.

The raised portion 32a of the second cover 32 is situated in a position opposite a region between the pair of support walls 91, that is, a position opposite the body casing 81. The raised portion 32a is higher in level than that portion of the second cover 32 which is situated outside the support walls 91 by a margin corresponding to the difference between the respective thickness of the casing 81 and the shield casing of the FDD 21.

Further, a leg portion 65 protrudes from a corner portion of the outer surface of the second cover 32. The leg portion 65 is designed so that the sum of its height and the height of the projection of the raised portion 32a is equal to the height of the leg portions 6 of the housing 1.

The DVD drive 23 and the second cover 32 thus constructed are coupled in the following manner. The second cover 32 is fitted on the body casing 81 of the DVD drive 23 from above so that the casing 81 is situated between the support walls 91, and the walls 91 are caused to engage their corresponding side faces of the casing 81. At the same time, the clicks 83 of the body casing 81 are caused individually to engage the engagement holes 62 in the support walls 91. By doing this, the second cover 32 can be securely coupled to the casing 81 with ease. The top portion of the body casing 81 is fitted in the raised portion 32a of the cover 32.

The assembly that combines the DVD drive 23 and the surface cover 32 is loaded into the recess 11 of the housing 1 from the side of the side wall 1d of the housing, and is set in the recess by pushing the projections 93 of the second cover 32 in engagement with the guide rails 13 into a predetermined position.

Since the depth of the recess 11 is equal to the thickness of the shield casing 42 of the FDD 21 or the body casing 71 of the CD-ROM drive 22, the body casing 81 of the DVD drive 23 set in the recess 11 projects upward from the first opening portion of the recession the side of the bottom wall 1b. The body casing 81 is held in the recess 11 in a manner such that its projecting part is concealed under the raised portion 32a of the second cover 32. The opposite side edge portions of the cover 32 are situated flush with the bottom wall 1b of the housing 1, while the raised portion 32a projects from the bottom wall 1b.

Figure 14:
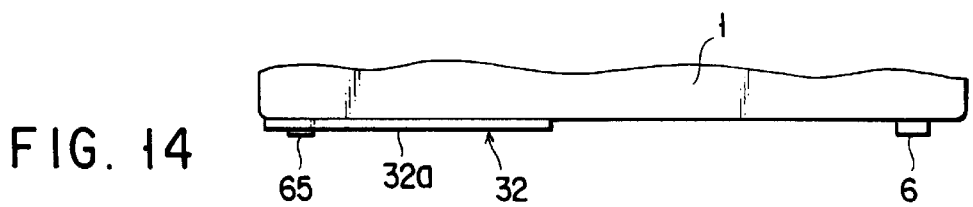

Although the thickness of the DVD drive 23 is greater than the depth of the mounting recess 11, therefore, the drive 23 can be set and held in the recess 11 with the same result as in the case of the assembly that is composed of the FDD 21 and the surface cover 31. Since the sum of the height of the projection of the raised portion 32a and the height of the leg portion 65 is equal to the height of the leg portions 6 on the housing 1 of the computer, moreover, the housing 1 can be supported securely by means of the leg portions 6 and 65, as shown in FIG. 14. Thus, the housing 1 can be supported steadily at a fixed height without regard to the identity of the cover used, first or second.

According to the portable computer constructed in manner described above, the mounting recess 11 in the housing 1 can be smoothly loaded with a pack-type device whose thickness is greater than the depth of the recess. Therefore, the depth of the recess 11 can be adjusted to the thickness of the FDD 21 or the CD-ROM drive 22 without being adjusted to the thickness of the DVD drive 23 that is the thickest pack-type device. Thus, the depth of the mounting section 10 need not be adjusted to the thickness of the thickest available pack-type device, so that the mounting section can be reduced in size, and the housing can be thinned.

It is to be understood that the present invention is not limited to the embodiment described above, and that various changes and modifications may be effected therein by one skilled in the art without departing from the scope or spirit of the invention. For example, the guide means for guiding and holding the pack-type device in the mounting section is not limited to the combination of the projections on the cover and the guide rails in the recess, and may be changed or modified if necessary. Available pack-type devices to be set in the mounting section are not limited to FDDs, CD-ROM drives, DVD drives, etc., and some other suitable pack-type devices, such as hard disk drives, may be also used for the purpose.

Figure 15:
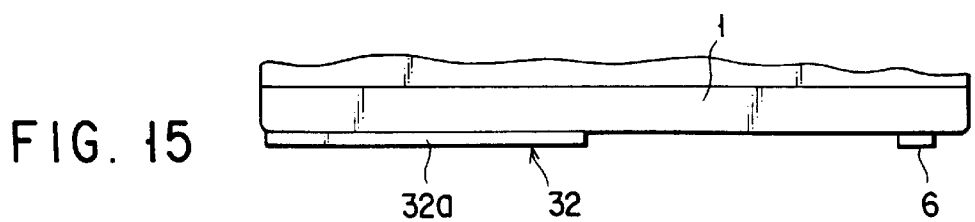
FIG. 15 is a front view schematically showing a modification of the computer.

In setting a thicker pack-type device, moreover, the projection height of the raised portion 32a of the second cover 32 may be made equal to the height of the leg portions 6 of the housing 1 so that the raised portion itself can be used as a leg portion, as shown in FIG. 15. In this case, the leg portion on the second cover may be omitted.

According to the embodiment described herein, furthermore, the recess that defines the mounting section opens in the bottom wall and one side wall of the housing. Alternatively, however, the recess may be designed to open in the bottom and front walls of the housing.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
 a housing including a bottom wall, a plurality of side walls set up individually on the peripheral edges of the bottom wall, and a mounting section formed of a recess opening in the bottom wall;
 a first pack-type device including a first device body having a first thickness and a first cover removably attached to the first device body, the first pack-type device interchangeably fitted in the mounting section in a manner such that the first cover closes an opening of the mounting section and is flush with the bottom wall; and a second pack-type device including a second device body having a second thickness greater than the first thickness and a second cover removably attached to the second device body, the second pack-type device interchangeably fitted in the mounting section in a manner, in place of the first pack-type device, such that the second cover closes the opening of the mounting section and projects from the bottom wall.

2. An electronic apparatus according to claim 1, wherein the mounting section has a depth substantially equal to the sum of the respective thickness of the first device body and the first cover.

3. An electronic apparatus according to claim 1, wherein the mounting section has a depth smaller than the sum of the respective thickness of the second device body and the second cover.

4. An electronic apparatus according to claim 3, wherein the second device body has a thickness greater than the depth of the mounting section.

5. An electronic apparatus according to claim 1, wherein the housing includes a plurality of first leg portions on the bottom wall, having a given height, and the first pack-type device includes a second leg portion on the first cover, having the same height as the first leg portions.

6. An electronic apparatus according to claim 5, wherein the second pack-type device is formed so that the height of a projection thereof from the bottom wall is equal to the height of the first leg portions.

7. An electronic apparatus according to claim 5, wherein the second pack-type device includes a third leg portion on the second cover such that the sum of the height of the projection of the second cover from the bottom wall and the height of the third leg portion is equal to the height of the first leg portions.

8. An electronic apparatus according to claim 1, wherein the recess includes a first opening portion opening in the bottom wall and a second opening portion opening one of the side walls so as to be continuous with the first opening portion, the first and second covers individually have sizes fit for the first opening portion, and the first and second device bodies have a front panel fitted in and closing the second opening portion.

9. An electronic apparatus according to claim 8, wherein the mounting section includes a guide portion in the recess, the first cover includes an engaging portion adapted to engage the guide portion so as to guide the first pack-type device in being loaded into the mounting section and holding the second pack-type device in the recess.

10. An electronic apparatus according to claim 9, wherein the first device body and the first cover are coupled to each other by means of a combination of a click formed on one of the two members and an engagement hole formed in the other member and adapted to engage the click.

11. An electronic apparatus according to claim 9, wherein the second device body and the second cover are coupled to each other by means of a combination of a click formed on one of the two members and a hole formed in the other member and adapted to engage the click.

12. An electronic apparatus according to claim 1, wherein the first device body is provided with a floppy disk drive.

13. An electronic apparatus according to claim 1, wherein the first device body is provided with a CD-ROM drive.

14. An electronic apparatus according to claim 1, wherein the first device body is provided with a digital video disk drive.

* * * * *

UNITED STATES PATENT AND TRADEMARK OFFICE
CERTIFICATE OF CORRECTION

PATENT NO. : 6,178,084 B1
DATED : January 23, 2001
INVENTOR(S) : Kazuya Shibasaki Page 1 of 1

It is certified that error appears in the above-identified patent and that said Letters Patent is hereby corrected as shown below:

<u>Title page,</u>
Item [57], ABSTRACT,
Line 9, "closes an the" should read -- closes an opening --;
Line 16, "project" should read -- projects --

Signed and Sealed this

Thirtieth Day of April, 2002

Attest:

JAMES E. ROGAN
*Attesting Officer*    *Director of the United States Patent and Trademark Office*